United States Patent [19]

Krause et al.

[11] Patent Number: 5,143,642

[45] Date of Patent: Sep. 1, 1992

[54] LIQUID-CRYSTALLINE MEDIUM FOR ELECTROOPTICAL DISPLAY ELEMENTS BASED ON THE ECB EFFECT

[75] Inventors: Joachim Krause, Dieburg; Thomas Geelhaar, Mainz; Reinhard Hittich, Modautal; Ulrich Finkenzeller, Plankstadt; Bernhard Rieger, Munster/Altheim; Georg Weber, Erzhausen, all of Fed. Rep. of Germany

[73] Assignee: Merck Patent Gesellschaft mit Beschraenkter Haftung, Darmstadt, Fed. Rep. of Germany

[21] Appl. No.: 641,024

[22] Filed: Jan. 11, 1991

[30] Foreign Application Priority Data

| Jan. 13, 1990 | [DE] | Fed. Rep. of Germany | 4000858 |
| Jan. 18, 1990 | [DE] | Fed. Rep. of Germany | 4001290 |
| Jan. 18, 1990 | [DE] | Fed. Rep. of Germany | 4001291 |
| Jan. 18, 1990 | [DE] | Fed. Rep. of Germany | 4001292 |
| Jan. 18, 1990 | [DE] | Fed. Rep. of Germany | 4001294 |

[51] Int. Cl.$^5$ .............. C09K 19/34; C09K 19/12; C07D 285/12
[52] U.S. Cl. .................. 252/299.61; 252/299.66; 548/136
[58] Field of Search .............. 548/136; 252/299.61, 252/299.66

[56] References Cited

U.S. PATENT DOCUMENTS

| 4,877,549 | 10/1989 | Sawada et al. | 252/299.63 |
| 4,952,699 | 8/1990 | Yong et al. | 548/136 |
| 5,021,189 | 6/1991 | Sawada et al. | 252/299.61 |
| 5,034,151 | 7/1991 | Shinjo et al. | 252/299.61 |

FOREIGN PATENT DOCUMENTS

| 0335348 | 10/1989 | European Pat. Off. . |
| 3703651 | 9/1987 | Fed. Rep. of Germany . |
| 0015254 | 1/1984 | Japan . |

OTHER PUBLICATIONS

G. Labrunie and J. Robert, "Transient Behavior of the Electrically Controlled Birefringence in a Nematic Liquid Crystal", J. Appl. Phys., vol. 44, No. 11, Nov. 1973, pp. 4869–4874.

M. F. Schiekel and K. Fahrenschon, "Deformation of Nematic Liquid Crystals with Vertical Orientation in Electrical Fields", Applied Physics Letters, vol. 19, No. 10, Nov. 15, 1991, pp. 391–393.

Primary Examiner—Robert L. Stoll
Assistant Examiner—C. Harris
Attorney, Agent, or Firm—Millen, White & Zelano

[57] ABSTRACT

The invention relates to a liquid-crystalline medium for electrooptical display elements based on the ECB effect, containing two components A and B which themselves comprise one or more individual compounds, component A having clearly negative dielectric anistropy and giving the liquid-crystalline phase a dielectric anistrophy of $\leq -0.3$, and component B having pronounced nematogeneity and a viscosity of not more than 30 mPa.s at 20° C., characterized in that component A contains one or more compounds containing a structural element 2 Claims, No Drawings

LIQUID-CRYSTALLINE MEDIUM FOR ELECTROOPTICAL DISPLAY ELEMENTS BASED ON THE ECB EFFECT

The invention relates to liquid-crystalline media for electrooptical display elements based on the ECB effect, and to the use of thiadiazole compounds as components of liquid-crystalline media for electrooptical display elements based on the ECB effect. The invention furthermore relates to novel thiadiazole compounds which are suitable for such media.

The ECB effect (electrically controlled birefringence) or DAP effect (deformation of aligned phases) was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline media having high values for the ratio between the elastic constants $K_3/K_1$ must have high values for the optical anisotropy $\Delta n$ and values for the dielectric anisotropy $\Delta\epsilon$ of between $-0.5$ and $-5$ in order that they can be employed for high-information display elements based on the ECB effect.

Electrooptical display elements based on the ECB effect have a homeotropic edge orientation, i.e. the liquid-crystalline medium has negative dielectric anisotropy.

The industrial application of this effect in electrooptical display elements requires LC media which must satisfy a large number of requirements. Of particular importance here are the chemical resistance to moisture, air and physical influences, such as heat, radiation in the infra-red, visible and ultra-violet ranges and electric direct and alternating fields. Furthermore, LC media which can be used industrially are required to have a nematic liquid-crystalline mesophase in a suitable temperature range and low viscosity.

None of the series of compounds having a liquid-crystalline mesophase which have been disclosed hitherto include a single compound which meets all these requirements. In general, therefore, mixtures of two to 40, preferably three to 18, compounds are prepared to give materials which can be used as LC media. However, optimum media can still not be prepared in this way, since no liquid-crystal materials having clearly negative dielectric anisotropy and/or low viscosity and/or correspondingly high optical anisotropy and/or particularly high values for $K_3/K_1$ and sufficient long-term stability were available hitherto.

Thus, there continues to be a great demand for liquid-crystalline media having favourable mesoranges, high values for $K_3/K_1$, high optical anisotropy $\Delta n$, negative dielectric anisotropy $\Delta\epsilon$ and high long-term stability.

The invention therefore had the object of finding an LC medium which does not have the abovementioned disadvantages, or only does so to a small extent, and, in particular, is characterised by very good long-term stability.

This object is achieved according to the invention by the provision of the liquid-crystalline medium or by the use of the thiadiazoles, preferably of the formula I. It has been found that the liquid-crystalline media according to the invention have very favourable properties and excellent long-term stability.

The invention thus relates to a liquid-crystalline medium for electrooptical display elements based on the ECB effect, containing two components A and B, which themselves comprise one or more individual compounds, component A having significantly negative dielectric anisotropy and giving the liquid-crystalline phase a dielectric anisotropy $\leq -0.3$, and componen pronounced nematogeneity and a viscosity of not more than 30 mPa.s at 20° C., characterised in that component A contains one or more compounds containing a structural element

In particular, the invention relates to a liquid-crystalline medium whose component A contains one or more compounds of the formula I:

in which $R^1$ and $R^2$ are each, independently of one another, an alkyl group, in each case having 1 to 15 carbon atoms, in which, in addition, one or more $CH_2$ groups, preferably one or two, may be replaced by a group selected from the group comprising —O—, —S—, —CO—, —CH-halogen—, —CHCN—, —O—CO—, —O—Coo—, —CO—O— and —CH=CH— or alternatively by a combination of two suitable groups, where two hetero atoms are not linked directly to one another, $A^\circ$ is in each case, independently of one another, 1,4-cyclohexylene which is unsubstituted or monosubstituted or polysubstituted by halogen atoms, and in which, in addition, one or two non-adjacent $CH_2$ groups may be replaced by —O— and/or —S— (CY), or is 1,4-phenylene which is unsubstituted or monosubstituted or polysubstituted by halogen atoms, and in which, in addition, one or more CH groups, preferably one or two, may be replaced by N (Ph), $Z^\circ$ is in each case, independently of one another, —CO—O—, —O—CO—, —$CH_2$O—, —O$CH_2$—, —$CH_2CH_2$— or a single bond, and p and q are each 0, 1 or 2, in which p+q is 1, 2 or 3.

A preferred embodiment of the invention is a liquid-crystalline medium in which, in the compound of the formula I, at least one group $A^\circ$ is 1,4-cyclohexylene and/or at least one group $Z^\circ$ is —$CH_2CH_2$—.

In particular, the invention relates to a liquid-crystalline medium in which, in the compound of the formula I, the group $A^\circ$ adjacent to the thiadiazole group is 1,4-cyclohexylene or the adjacent group $Z^\circ$ is —$CH_2CH_2$—.

The invention also relates to the use of thiadiazole compounds of the formula I as components of liquid-crystalline media for electrooptical displays based on the ECB effect, to an electrooptical display based on the ECB effect, characterised in that it contains, as dielectric, one of the media according to the invention, and to the novel thiadiazole compounds described below.

1,3,4-Thiadiazoles of the formula IA

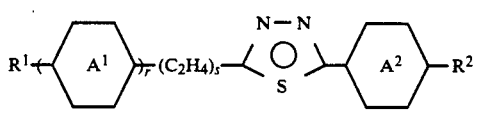

in which $R^1$ and $R^2$ are each, independently of one another, alkyl, alkoxy, oxaalkyl, alkenyl or alkenyloxy having up to 5 carbon atoms, r and s are each, independently of one another, 0 or 1, and $A^1$ and $A^2$ are each 1,4-phenylene, or one of the rings $A^1$ and $A^2$ is alternatively trans-1,4-cyclohexylene, with the proviso that, in the case where s=0, $A^1$ is trans-1,4-cyclohexylene and $R^2$ is alkoxy or alkenyloxy having up to 5 carbon atoms, 1,3,4-thiadiazoles of the formula IC

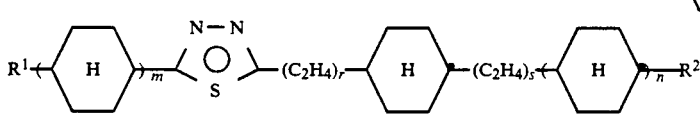

in which $R^1$ and $R^2$ are each, independently of alkyl, alkoxy, oxaalkyl, alkenyl or alkenyloxy having up to 7 carbon atoms, m, n, r and s are each, independently of one another, 0 or 1, with the proviso that, in the case where n=0, r is 1, 1,3,4-thiadiazoles of the formula IB

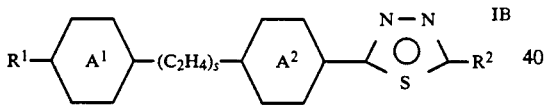

in which $R^1$ and $R^2$ are each, independently of one another, alkyl, alkoxy, oxaalkyl, alkenyl or alkenyloxy having up to 12 carbon atoms, s is 0 or 1, and $A^1$ and $A^2$ are each 1,4-phenylene, or one of the rings $A^1$ and $A^2$ is alternatively trans-1,4-cyclohexylene, with the proviso that, in the case where s=0, one of the rings $A^1$ and $A^2$ is trans-1,4-cyclohexylene, and 1,3,4-thiadiazoles of the formula ID

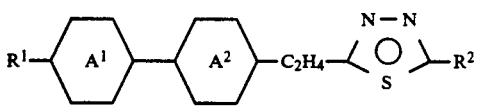

in which $R^1$ and $R^2$ are each, independently of one another, alkyl, alkoxy, oxaalkyl, alkenyl or alkenyloxy having up to 12 carbon atoms, and $A^1$ and $A^2$ are each 1,4-phenylene, or one of the rings $A^1$ and $A^2$ is alternatively trans-1,4-cyclohexylene.

The novel thiadiazole compounds of the formulae IA, IB, IC and ID are likewise subject-matter of the present invention.

The compounds of the formulae IA, IB, IC and ID may be used as components of liquid-crystalline phases, in particular for displays based on the principle of the twisted cell, the guest-host effect, the effect of deformation of aligned phases or the effect of dynamic scattering.

Compounds of the formula I are preferably also suitable for use as components in liquid-crystalline phases for displays based on the ECB effect.

Similar compounds have been disclosed, for example, in WO 88/08019 as components of ferroelectric liquid-crystal mixtures:

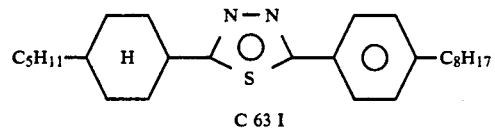

C 63 I

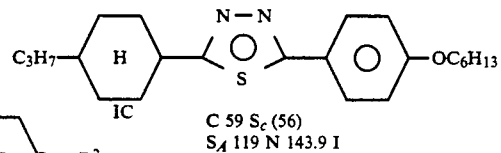

C 59 S$_c$ (56)
S$_A$ 119 N 143.9 I

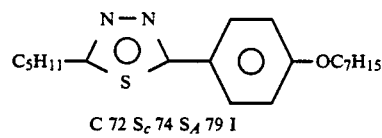

C 72 S$_c$ 74 S$_A$ 79 I

However, there is no mention of the advantageous nematic properties of the compounds described here having wing groups up to a maximum of 5 carbon atoms.

The compound of the formula

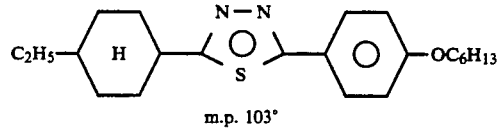

m.p. 103° has also been disclosed (K. Dimitrowa et al., J. prakt. Chem. 322, 933 (1980)), but is also unsuitable for nematic media due to the high melting point.

The same paper gives, inter alia, data for the following thiadiazoles:

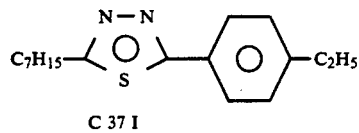

C 37 I

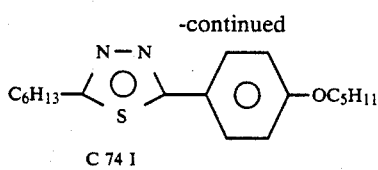

C 74 I

However, there is no indication that these isotropic materials are suitable as components for nematic mixtures.

Surprisingly, it has been found that the addition of compounds of the formulae IA to ID give liquid-crystalline phases which meet all the abovementioned criteria in an excellent manner. This also applies to the compounds of the sub-formula IAa, although most of these compounds are isotropic oils.

In addition, the provision of the compounds of the formulae IA to ID very generally considerably extends the range of liquid-crystalline substances which are suitable, from various applicational points of view, for the preparation of nematic mixtures.

The compounds of the formulae IA to ID have a broad range of applications. Depending on the choice of substituents, these compounds can be used as base materials from which liquid-crystalline phases are predominantly composed; however, it is also possible to add compounds of the formulae IA to ID to liquid-crystalline base materials from other classes of compound in order, for example, to optimize the dielectric and/or optical anisotropy of a dielectric of this type. The compounds of the formulae IA to ID are furthermore suitable as intermediates for the preparation of other substances which can be used as constituents of liquid-crystalline phases.

In the pure state, the compounds of the formulae IA to ID are colourless and form liquid-crystalline mesophases in a temperature range which is favourably located for electrooptical use. They are very stable chemically, thermally and to light.

The invention thus relates to the compounds of the formulae IA to ID, and to the use of these compounds as components of liquid-crystalline phases. The invention furthermore relates to liquid-crystalline phases containing at least one compound of the formulae IA to ID, and to liquid-crystal display elements which contain such phases.

Above and below, $R^1$, $R^2$,

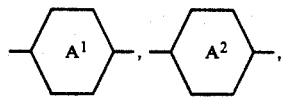

m, n, r and s are as defined above, unless expressly stated otherwise.

If $R^1$ and/or $R^2$, are alkyl radicals in addition, one ("oxaalkyl") $CH_2$ group may be replaced by O atoms, they may be straight-chain or branched. They are preferably straight-chain, have 1, 2, 3, 4 or 5 carbon atoms and accordingly are preferably methyl, ethyl, propyl, butyl, pentyl, 2-oxapropyl (=methoxymethyl), 2-(=ethoxymethyl) or 3-oxabutyl (=2-methoxyethyl), or 2-, 3- or 4-oxapentyl. They are likewise preferably methoxy, ethoxy, propoxy, butoxy or pentoxy.

Particular preference is also given to alkyl radicals or alkoxy radicals in which one $CH_2$ group has been replaced by a —CH=CH— group.

Compounds of the formulae IA to ID having branched wing groups $R^1$ or $R^2$ may occasionally be of importance due to better solubility in the customary liquid-crystalline base materials, but in particular as chiral dopes if they are optically active.

In the case of compounds containing branched wing groups, the formulae IA to ID cover the optical antipodes and racemates, and mixtures thereof.

Of the compounds of the formulae IA to ID and their sub-formulae, those are preferred in which at least one of the radicals present therein has one of the preferred meanings indicated.

Particularly preferred smaller groups of compounds of the formula IA according to the invention comprises those of the following sub-fomrulae:

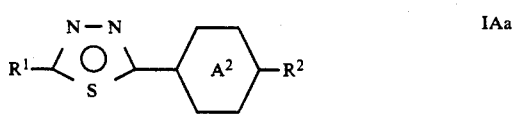

IAa

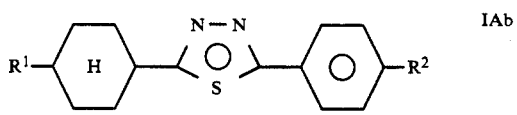

IAb

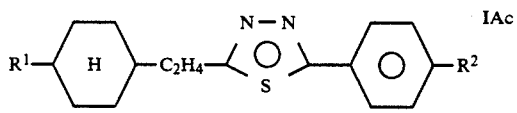

IAc

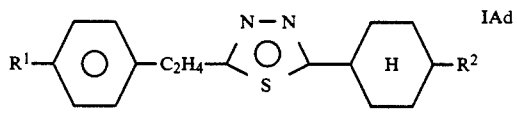

IAd

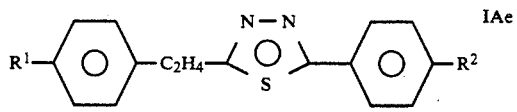

IAe

Particularly preferred smaller groups of compounds of the formula IB according to the invention comprises those of the following sub-formulae:

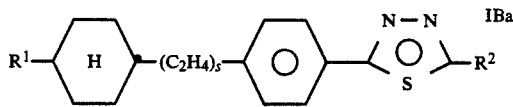

IBa

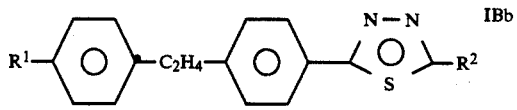

IBb

Particularly preferred smaller groups of compounds of the formula IC according to the invention comprises those of the following sub-formulae:

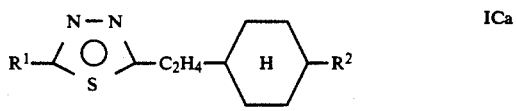

ICa

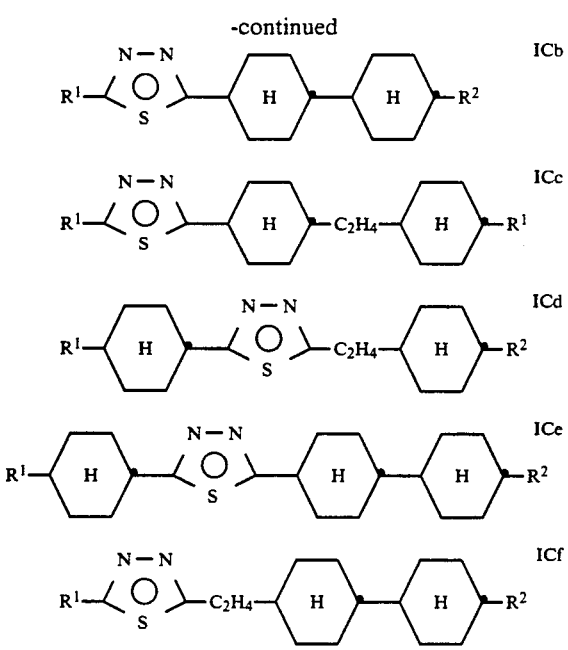

Particularly preferred compounds of the formula ID are those of the following sub-formulae:

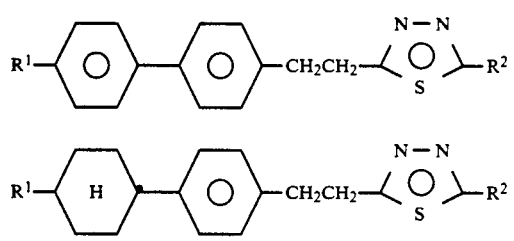

The compounds of the formula I are prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for the reactions mentioned. Use may also be made here of variants which are known per se, but are not described in greater detail.

If desired, the starting materials can also be prepared in situ, by not isolating them from the reaction mixture, but instead reacting them further to give the compounds of the formula I.

Thus, the compounds of the formula I can be prepared by reacting corresponding N,N'-diacylhydrazides with conventional thiating reagents, such as $P_4S_{10}$ or Lawesson's reagent. Furthermore, appropriately substituted benzohydrazides or cyclohexanecarbohydrazides can be reacted with substituted benzoyl chlorides or cyclohexanecarbonyl chlorides with subsequent cyclisation using $P_4S_{10}$ in the presence of nitrogen bases in inert solvents. In the case of compounds where s=1, the corresponding cyclohexyl- or phenylpropionyl chlorides are used.

The media according to the invention are prepared in a conventional manner. In general, the desired amount of the components used in secondary amounts is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives known to those skilled in the art and described in the literature. For example, 0-15 % of pleochroic dyes can be added, and furthermore conductive salts, for preferablyethyldimethyldodecylammonium4-hexoxybenzoate, tetrabutylammonium tetraphenylborate or complex salts of crown ethers (cf., for example, Haller et al., Mol. Cryst. Liq. Cryst. Volume 24, pages 249–258 (1973)) can be added to improve conductivity or substances can be added to modify the dielectric anisotropy, the viscosity and/or the orientation of the nematic phases. Substances of this type are described, for example, in German Offenlegungsschriften 22 09 127, 22 40 864, 23 21 632, 23 38 281, 24 50 088, 26 37 430 and 28 53 728.

The individual compounds forming the individual components A, B, C and D are either known or their modes of preparation are easy for a person skilled in the relevant art to deduce from the prior art, since they are based on standard methods described in the literature. The same applies to the individual compounds of the formulae I, II, III, IV and V.

Component A has a clearly negative dielectric anisotropy ($\Delta\epsilon$) and gives the medium a dielectric anisotropy $\leq -0.3$, preferably $\leq -0.5$. The value $\Delta\epsilon$ of the liquid-crystalline medium is preferably in the range between $-0.3$ and $-5.0$, preferably between $-0.5$ and $-5.0$. For component A, an individual compound, or several individual compounds, which have a $\Delta\epsilon$ value $-0.5$, preferably $\Delta\epsilon \leq -0.8$, are preferably selected. This value must be more negative the smaller the proportion of component A in the overall mixture. If the proportion of component A is very large, the value $\Delta\epsilon$ of component A may also be only slightly negative, for example in the range from $-0.5$ to $-1.0$.

It is in principle possible to employ any known liquid-crystalline compound having clearly negative dielectric anisotropy (preferably $\Delta\epsilon \leq -0.3$, in particular $\leq -0.5$) for component A. Compounds of this type are known to those skilled in the art and are described, for example, in D. Demus et al., Flüssige Kristalle in Tabellen II [Liquid Crystals in Tables II], VEB Deutscher Verlag für Grundstoffindustrie, Leipzig, 1984, and in H. Kelker and R. Hatz, Handbook of Liquid Crystals, Weinheim, Verlag Chemie, 1980, and in German Offenlegungsschrift 33 32 691 and German Offenlegungsschrift 33 32 692. Particular preference is given to the compounds of the formula I described below. Preference is also given to compounds containing a 2,3-difluoro- or 2,3-dicyano—1,4-phenylene structural element. These compounds are described, for example, in the Offenlegungsschriften WO 85/04874, DE-OS 34 10 734, DE-OS 29 33 563, EP-OS 0 084 194, EP-OS 0 085 995, DE-OS 33 24 686, EP-OS 0 087 963 and DE-OS 29 37 700. Preference is also given to compounds containing a 2- or 3-cyano-1,4-phenylene structural element, such as, for example, the biphenyl, terphenyl and cyclohexylbiphenyl compounds described in German Offenlegungsschrift 32 05 766.

Component A preferably contains one or more compounds containing a structural element

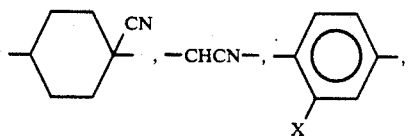

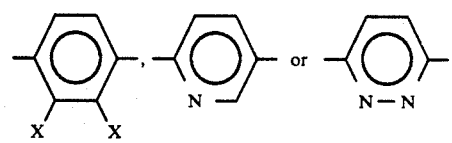

in which X is halogen or CN.

If X is halogen, fluorine and chlorine, in particular fluorine, are preferred. Particular preference is given to compounds containing a structural element

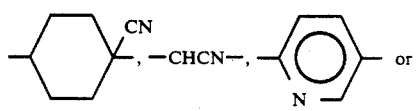

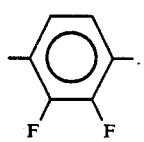

Some of these compounds are known. The references are given above and below. All compounds which are suitable for this application can be prepared by standard methods described in the literature, easily carried out by an expert in the relevant field.

Particularly preferred individual compounds of component A are those of the formula I, and liquid-crystal compounds containing the structural element:

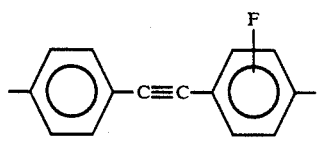

These laterally fluorinated tolan derivatives are distinguished by high optical anisotropy and can be utilised as base components for liquid-crystalline phases according to the invention, for example in a proportion of 10 to 90%, preferably 20 to 80%.

Particularly preferred laterally fluorinated tolan derivatives are those of the formula VI

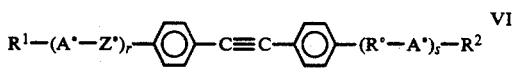

VI in which $R^1$, $R^2$, $A^*$ and $Z^*$ are as defined in the formula I, and r and s are each, independently of one another, 0 or 1. Particularly preferred smaller groups are those of the sub-formulae VIa to VIf:

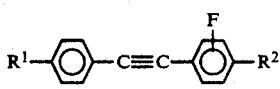

VIa

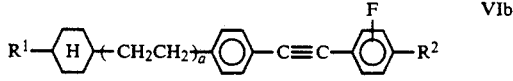

VIb

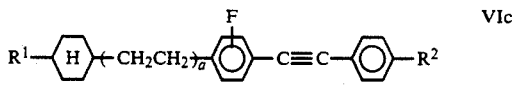

VIc

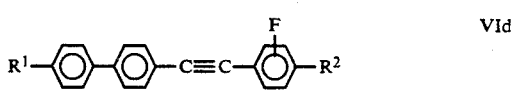

VId

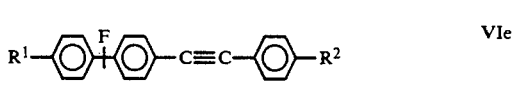

VIe

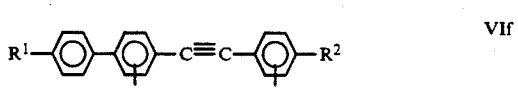

VIf s here is 0 or 1. $R^1$ and $R^2$ where are preferably each, independently of one another, n-alkyl or n-alkoxy, each having from 1 to 7 carbon atoms. Preference is likewise given to compounds of the formula VI in which the fluorinated 1,4-phenylene group is replaced by a pyridine-2,5-diyl group or a 2,3-difluoro-1,4-phenylene group.

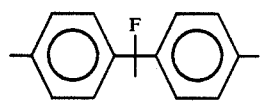

is a 4,4'-biphenyl group which is substituted in the 2-, 3-, 2'- or 3'-position by fluorine.

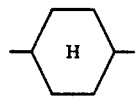

is preferably trans-1,4-cyclohexylene.

Preferred compounds of this type are those of the formulae VIg to VIk

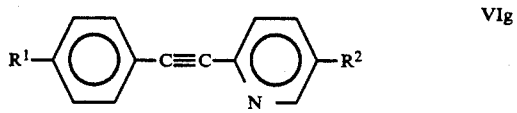

VIg

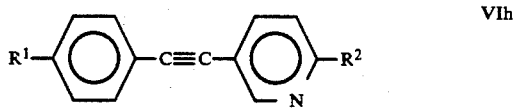

VIh

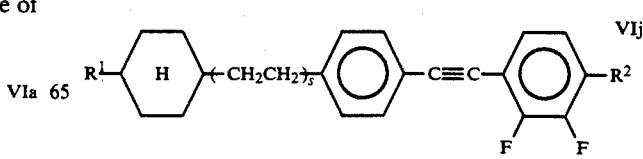

VIj

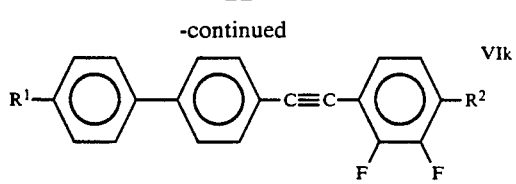

in which R¹ and R² have the preferred meanings given above.

If component A contains compounds having $\Delta\epsilon \leq -2$ the proportion of component A in the liquid-crystalline phase is preferably 5 to 50%, in particular preferably 5 to 30%.

Component B has pronounced nematogeneity and a viscosity of not more than 30 mPa.s, preferably not more than 25 mPa.s, at 20° C. Particularly preferred individual compounds of component B are extremely low-viscosity, nematic liquid crystals having a viscosity of not more than 18, preferably not more than 12 mPa.s at 20° C. Component B is monotropic- or enantiotropic-nematic, has no smectic phases and is able to prevent the occurrence of smectic phases in liquid-crystal mixtures down to very low temperatures. If, for example, the same percentage of different materials having high nematogeneity is added to a smectic liquid-crystal mixture, the nematogeneity of these materials can be compared through the degree of suppression of smectic phases which is achieved.

A material which prevents the occurrence of a smectic phase down to a lower temperature is thus characterised by relatively high nematogeneity. A person skilled in the art can easily determine which low-viscosity materials are suitable here. For example, a material of this type, in a mixture comprising 45% of trans,trans-4-methoxy-4'-propylcyclohexylcyclohexane, 8% of trans,trans-4-ethoxy-4'-propylcyclohexylcyclohexane, 18% of trans,trans-4-propoxy-4'-propylcyclohexylcyclohexane, 13% of trans,trans-4-ethoxy-4'-butylcyclohexylcyclohexane 8% of trans,trans-4-ethoxy-4'-pentylcyclohexylcyclohexane and 8% of trans,trans-4-methoxy-4'-pentylcyclohexylcyclohexane and having a smectic-nematic transition at +13° C., must, when added in an amount of 20%, suppress the smectic-nematic transition down to temperatures ≦0° C., preferably down to < −10° C., in particular down to < −20° C. A person skilled in the art is familiar with a large number of suitable materials from the literature (see above). Particular preference is given to compounds of the formula V

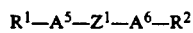

in which

R¹ and R² are each, independently of one another, an alkyl group, in each case having 1 to 15 carbon atoms, and in which, in addition, one or more CH₂ groups may be replaced by a group selected from the group comprising —O—, —S—, —CO—, —CH— halogen—, —CHCN—, —O—CO—, —O—COO—, —CO—O— and —CH=CH—, or by a combination of two suitable groups, where two hetero atoms are not linked directly to one another, Z¹ is —CO—O—, —O—CO—, —CH₂CH₂—, —OCH₂—, —CH₂O— or a single bond, and A⁵ and A⁶ are each, independently of one another, trans-1,4-cyclohexylene or unsubstituted or fluorine-substituted 1,4-phenylene.

R¹ and R² have the preferred meanings given in the formula I. Z¹ is preferably —CO—O— or a single bond, particularly preferably a single bond. A⁵ is preferably trans-1,4-cyclohexylene. However, preference is also given for component B to compounds of the formula I, so long as they meet the requirements for components of compound B. Some smaller groups of preferred compounds for component B are given below:

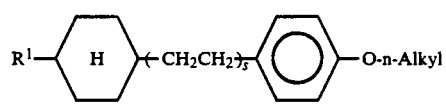

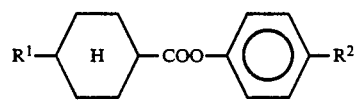

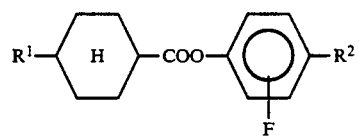

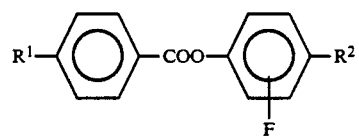

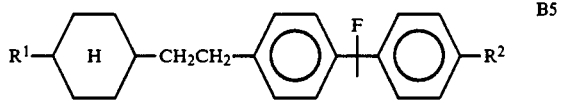

Particularly preferred compounds B1 are those of the sub-formulae B11

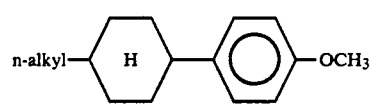

in which n-alkyl has 2 to 5, preferably 3, carbon atoms.

The proportion of component B in the liquid-crystalline phase depends on the nematogeneity of the individual compound(s) selected and the clear point thereof. However, a person skilled in the art can easily determine the proportion for the desired application by routine methods. The proportion of component B is normally between 5 and 40%, preferably 10 and 30%.

If the mixture developed from components A, B and D or from B and D does not achieve the clear point necessary for the particular application, addition of a component C having a high clear point of, preferably, at least 150° C., preferably at least 200° C., is necessary. The proportion of component C is selected, by routine methods, so that a clear point of at least 60° C., preferably at least 80° C., in particular, for many applications, at least 100° C., is achieved in the liquid-crystalline phase. Compounds which are suitable for component C are described in large number in the literature (see above) and are known to a person skilled in the art. For example, high-clear-point compounds of the formula I are suitable. Smaller groups of suitable compounds are those of the formula Cl $$R^1-Q^1-(Q^2)_n-Q^3-R^2 \qquad Cl$$

in which $Q^1$, $Q^2$ and $Q^3$, independently of one another, are

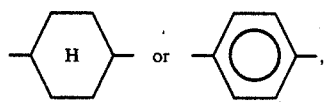

and one of the groups $Q^1$ to $Q^3$ is alternatively

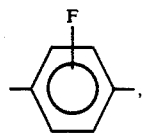

and n is 1 or 2. $R^1$ and $R^2$ have the preferred meanings given in the formula I. Also suitable are compounds of the abovementioned formula Cl, in which a bridging member —CO—O—, —O—CO— or —CH$_2$CH$_2$— is inserted between two of the groups $Q^1$, $Q^2$ and $Q^3$.

Component D contains nematic compounds having at most slightly positive dielectric anisotropy ($\Delta\epsilon$) and an optical anisotropy ($\Delta n$) of at least 0.2. $\Delta\epsilon$ is preferably $\leq \pm 1.0$, but in particular $\leq \pm 0.5$. Particular preference is given to compounds where $\Delta\epsilon$ 0. n is preferably $\geq 0.22$, but in particular $\geq 0.30$. Compounds of this type are described in the literature (see above). Further references are U.S. Pat. No. 3,925,482, FR 22 34 261-A, Japanese Preliminary Published Specification 86/280441, European Offenlegungsschrift 0 058 981, German Offenlegungsschrift 37 09 167 and German Offenlegungsschrift 37 10 069. $\Delta n$ is measured as usual at 589 nm and 20° C.

These compounds are preferably tolan compounds containing the structural element

in which $Q^1$ and $Q^2$ are each, independently of one another, 1,4-phenylene which is unsubstituted or monosubstituted or polysubstituted by halogen atoms, CH$_3$ groups and/or nitrile groups, and one of the groups $Q^1$ and $Q^2$ is alternatively pyridine-2,5-diyl.

Particular preference is given to the compounds of the formula III

in which
$R^3$ and $R^4$ are each, independently of one another, an alkyl group, in each case having 1 to 15 carbon atoms, and in which, in addition, one or more CH$_2$ groups may be replaced by a group selected from the group comprising —O—, —S—, —CO—, —CH— halogen-, —CHCN—, —O—CO—, —O—COO—, —CO—O— and —CH=CH—, or alternatively by combination of two suitable groups, where two hetero atoms are not linked directly to one another, $Q^1$ and $Q^2$ are each, independently of one another, 1,4-phenylene which is unsubstituted or monosubstituted or polysubstituted by halogen atoms, CH$_3$ groups and/or nitrile groups, and one of the groups $Q^1$ and $Q^2$ is alternatively pyridine2,5-diyl, $A^3$ and $A^4$ are each, independently of one another, trans1,4-cyclohexylene in which, in addition, one or two non-adjacent CH$_2$ groups may be replaced by —O— and/or —S—, or 1,4-phenylene in which, in addition, one or more CH groups may be replaced by N, o and p are each, independently of one another, 0 or 1, and $Z^1$ and $Z^2$ are as defined in the formula I.

Preferred embodiments of the media according to the invention are given below:

The medium contains a further component C having a high clear point of at least 150° C. in order to induce a clear point of at least 60° in the liquid-crystalline medium, and/or a further component D having at most slightly positive dielectric anisotropy and an optical anisotropy of at least 0.2, it being possible, in order to achieve particularly short switching times, to replace all or some of component A by suitable individual compounds of component D having clearly negative dielectric anisotropy.

Component B is monotropic- or enantiotropic-nematic, has no smectic phases and prevents the occurrence of smectic phases in liquid-crystal mixtures down to very low temperatures.

Component B contains at least one compound of the formula V $$R^1-A^5-Z^1-A^6-R^2 \qquad V$$

in which
$R^1$ and $R^2$ are each, independently of one another, an alkyl group, in each case having 1 to 15 carbon atoms, in which, in addition, one or more CH$_2$ groups may be replaced by a group selected from the group comprising —O—, —S—, —CO—, —CH—halogen—, —CH-CN—, —O—CO—, —O—COO—, —CO—O— and —CH=CH— or alternatively by a combination of two suitable groups, where two hetero atoms are not linked directly to one another, $Z^1$ is —CO—O—, —O—CO—, —CH$_2$CH$_2$—, —OCH$_2$—, —CH$_2$O— or a single bond, and $A^5$ and $A^6$ are each, independently of one another, trans-1,4-cyclohexylene or unsubstituted or fluorine-substituted 1,4-phenylene.

Component D contains at least one tolan compound containing the structural element

in which $Q^1$ and $Q^2$ are each, independently of one another, 1,4-phenylene which is unsubstituted or mono-substituted or polysubstituted by halogen atoms, CH$_3$ groups and/or nitrile groups, and one of the groups $Q^1$ and $Q^2$ may alternatively be pyridine-2,5-diyl.

The medium contains at least one compound of the formula I

in which
$R^1$ and $R^2$ are each, independently of one another, an alkyl group, in each case having 1 to 15 carbon atoms, in which, in addition, one or more CH$_2$ groups may be replaced by a group selected from the group comprising —O—, —S—, —CO—, —CH-halogen—, —CHCN—, —O—CO—, —O—COO—, —CO—O— and —CH=CH— or alternatively by a combination of two suitable groups, where two hetero atoms are not linked directly to one another, A* is in each case, independently of one another, 1,4-cyclohexylene which is unsubstituted or monosubstituted or polysubstituted by halogen atoms, and in which, in addition, one or two non-adjacent $CH_2$ groups may be replaced by —O— and/or —S— (CY), or 1,4-phenylene which is unsubstituted or monosubstituted or polysubstituted by halogen atoms, and in which, in addition, one or more CH groups may be replaced by N (Ph), Z* is in each case, independently of one another, —CO—O—, —O—CO—, —$CH_2$O—, —O$CH_2$—, —$CH_2CH_2$— or a single bond, and p and q are each 0, 1 or 2, where p+q is 1, 2 or 3.

The medium contains at least one compound of the formula III $$R^3-(A^3-Z^1)_o-Q^1-C\equiv C-Q^2-(^2-A^4)_p-R^4 \qquad III$$

in which $R^3$ and $R^4$ are each, independently of one another, an alkyl group, in each case having 1 to 15 carbon atoms, in which, in addition, one or more $CH_2$ groups may be replaced by a group selected from the group comprising —O—, —S—, —CO—, —CH—halogen—, —CH-CN—, —O—CO—, —O—COO—, —CO—O— and —CH=CH— or alternatively by a combination of two suitable groups, where two hetero atoms are not linked directly to one another, $Q^1$ and $Q^2$ are each, independently of one another, 1,4-phenylene which is unsubstituted or monosubstituted or polysubstituted by halogen atoms, $CH_3$ groups and/or nitrile groups, and one of the groups $Q^1$ and $Q^2$ is alternatively pyridine-2,5-diyl, $A^3$ and $A^4$ are each, independently of one another, trans-1,4-cyclohexylene in which, in addition, one or two non-adjacent $CH_2$ groups may be replaced by —O— and/or —S—, or 1,4-phenylene in which, in addition, one or more CH groups may be replaced by N, o and p are each, independently of one another, 0 or 1, and $Z^1$ and $Z^2$ are as defined for Z* in the formula I.

Component D increases the ratio between the elastic constants $K_3/K_1$ in the phase to at least 1.2.

For m=n=0, particular preference is given, amongst the compounds of the formula I, to the following substances of the sub-formulae 1–3:

| | |
|---|---|
| alkoxy—Phe—C≡C—Phe—F | 1 |
| alkoxyalkoxy—Phe—C≡C—Phe—alkyl | 2 |
| alkoxyalkoxy—Phe—C≡C—Phe—halogen | 3 |

A smaller group of particularly preferred compounds of the formula I where m+n≠0 comprises those of the sub-formulae 4–18:

| | |
|---|---|
| alkyl—Cyc—Phe—C≡C—Phe—alkoxy | 4 |
| alkyl—Cyc—CH₂CH₂—Phe—C≡C—Phe—alkyl | 5 |
| alkyl—Cyc—CH₂CH₂—Phe—C≡C—Phe—alkoxy | 6 |
| alkyl—Cyc—Phe—C≡C—PheF—alkoxy | 7 |
| alkyl—Phe—CH₂CH₂—Phe—C≡C—Phe—alkyl | 8 |
| alkyl—Phe—PheX—C≡C—Phe—alkoxy | 9 |
| alkyl—Cyc—COO—Phe—C≡C—Phe—alkoxy | 10 |
| alkoxy—Phe—COO—Phe—C≡C—Phe—halogen | 11 |
| alkyl—Dio—Phe—C≡C—Phe—alkoxy | 12 |
| alkyl—Cyc—Phe—C≡C—Phe—Phe—alkoxy | 13 |
| alkyl—Cyc—Phe—C≡C—PheX—Cyc—alkyl | 14 |
| alkyl—Cyc—COO—Phe—C≡C—Phe—Phe—alkoxy | 15 |
| alkoxy—Phe—Phe—C≡C—PheX—Phe—alkyl | 16 |
| alkyl—Cyc—CH₂CH₂—Phe—C≡C—Phe—Phe—alkyl | 17 |
| alkyl—Cyc—CH₂CH₂—Phe—C≡C—Phe—Cyc—alkyl | 18 |

Likewise preferred for component D are the compounds of the formula III described below, having relatively high birefringence. Particularly preferred phases according to the invention simultaneously contain tolan compounds and compounds of the formula III, the laterally fluorinated terphenyl derivatives described below being particularly preferred.

The proportion of component D in the liquid-crystalline phase is normally 10 to 80%, preferably 30 to 60%. Particular preference is given to proportions of greater than 50%.

For displays having an active matrix, a high value for the ratio between the elastic constants $K_3/K_1$ is not crucial, but in passive multiplexes, component D is preferably selected and added in an amount such that the ratio between the elastic constants $K_3/K_1$ in the phase is increased to at least 1.2, preferably to at least 1.4.

The individual components A, B, C and D and the compounds of the formulae I to VI of the liquid-crystal phases according to the invention are either known or their modes of preparation are easy to derive from the prior art by an expert in the relevant field, since they are based on standard methods described in the literature.

Appropriate compounds of the formula II are described, for example, in German Offenlegungsschriften 32 31 707, 33 20 024, 33 32 691, 33 32 692, 34 07 013, 34 37 935, 34 43 929, 35 33 333 and 36 08 500. Compounds of the formula II are described for example, in German Offenlegungsschriften 30 42 391 and 31 17 152, U.S. Pat. No. 4,490,305, German Offenlegungsschriften 34 10 734 and 29 33 563, and European Offenlegungsschriften 0 084 194, 0 117 631 and 0 132 377.

Some of the compounds of the formulae III to VI are described in U.S. Pat. No. 3,925,482, German Offenlegungsschrift 32 46 440, FR 22 34 261-A, Japanese Preliminary Published Specification 86/280441, German Offenlegungsschriften 37 09 167, 37 10 069, 26 36 684, 29 33 563, 24 29 093 and 30 37 303, European Offenlegungsschrift 0 084 194, GB 2,155,465 A, European Offenlegungsschrift 0 058 981, Japanese Preliminary Published Specification 60/155142 and by D. Demus et al., Flüssige Kristalle in Tabellen II [Liquid Crystals in Tables II], VEB Deutscher Verlag für Grundstoffindustrie, Leipzig, 1984.

The phases according to the invention preferably contain at least 10% of compounds of the formula II, particularly preferably 10 to 30% of compounds of the formula II: $R^1-(A^°-Z^°)_p-A-(Z^°-A^°)_p-R^2$, in which $R^1$, $A^°$, $Z^°$, p, q, and $R^2$ have the meaning given in Formula I. The phases according to the invention preferably contain at least one compound of Formula II in which A is a 1,4-cyclohexylene group which is substituted in the 1- or 4-position by CN, in particular a group of the formula

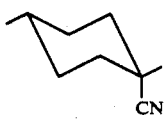

containing a nitrile group in the axial position. $R^1$ and $R^2$ are preferably straight-chain alkyl or alkoxy, in particular alkyl, preferably having 2 to 7 carbon atoms. $A^°$ is preferably in each case, independently of one another, trans-1,4-cyclohexylene, 1,4-phenylene (unsubstituted or fluorine-substituted), pyrimidine-2,5-diyl or pyridine-2,5-diyl. $Z^°$ is preferably in each case a single bond. p is preferably 1 or 2.

Particularly preferred compounds of the formula II are those of the sub-formulae IIa to IIc:

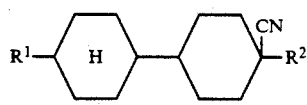 IIa

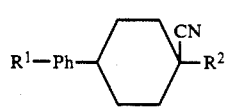 IIb

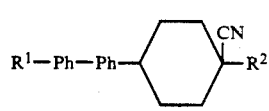 IIc

Particular preference is given to compounds of the sub-formulae IIa and IIc. —Ph—Ph— is preferably

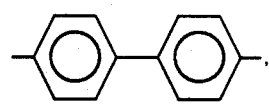

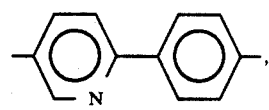

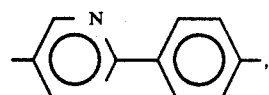

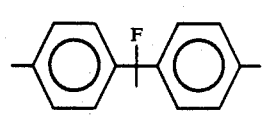

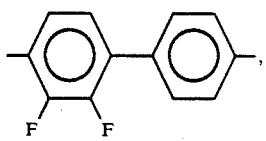

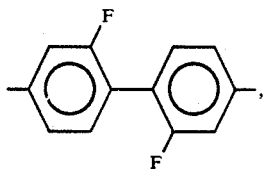

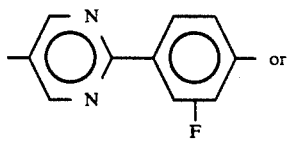 or

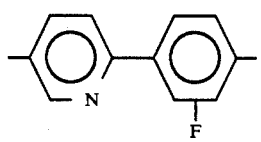

or the mirror image of the asymmetric groups. Preferred phases according to the invention contain at least one compound of the formula IIc, in particular at least one laterally fluorinated compound of the formula IIc. Preference is also given to phases according to the invention containing compounds of the formula IIa and compounds of the formula I.

$R^1$ and $R^2$ are preferably, independently of one another, straight-chain alkyl having 2 to 7 carbon atoms.

Preferred phases contain 30 to 90%, in particular 49 to 86%, of compounds of the formula I.

A is preferably

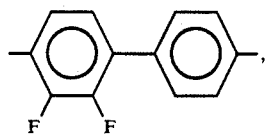

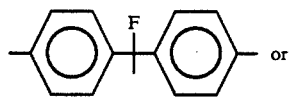 or

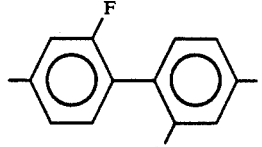

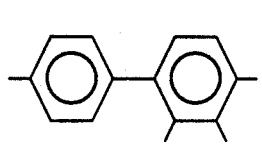

$R^3$ and $R^4$ are preferably each, independently of one another, alkyl or alkoxy having 1 to 7 carbon atoms, m is preferably 1. $A^1$ and $A^2$ are preferably each, independently of one another, trans-1,4-cyclohexylene or 1,4-phenylene. $Z^1$ and $Z^2$ are preferably each, independently of one another, —CO—O—, —O—CO—, —CH$_2$CH$_2$— or a single bond, particularly preferred compounds of the formula II are those of the sub-formulae IIaa to IIg:

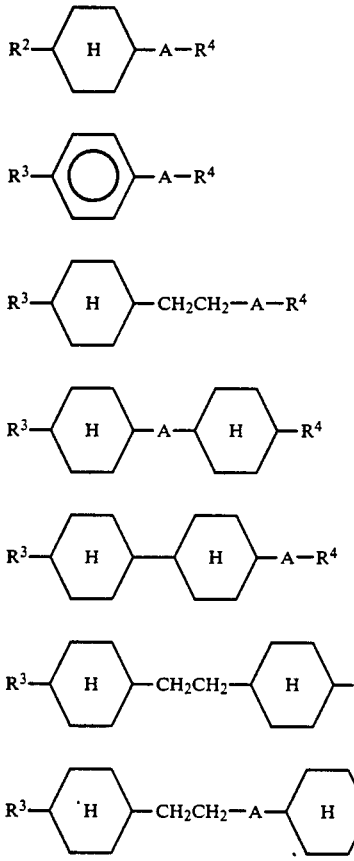

Particular preference is given to compounds of the sub-formulae IIa, IIb, IIc and IId.

Particular preference is given to the neamtogenic compounds of the formula II having high birefringence (preferably ≧0.2), in which m is preferably 1, n is preferably O, $Z^1$ (and $Z^2$) are preferably single bonds, $A^1$ (and $A^2$) are preferably 1,4-phenylene or 1,4-phenylene which is substituted in 2- or 3-position by fluorine, and $R^3$ and $R^4$ are preferably each, independently of one another, n-alkyl or n-alkoxy having 1–10 carbon atoms.

Particular preference is given to the following smaller groups of compounds of the formula IIb:

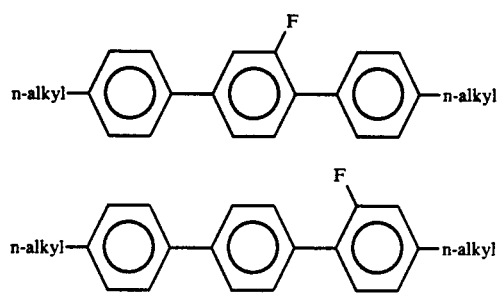

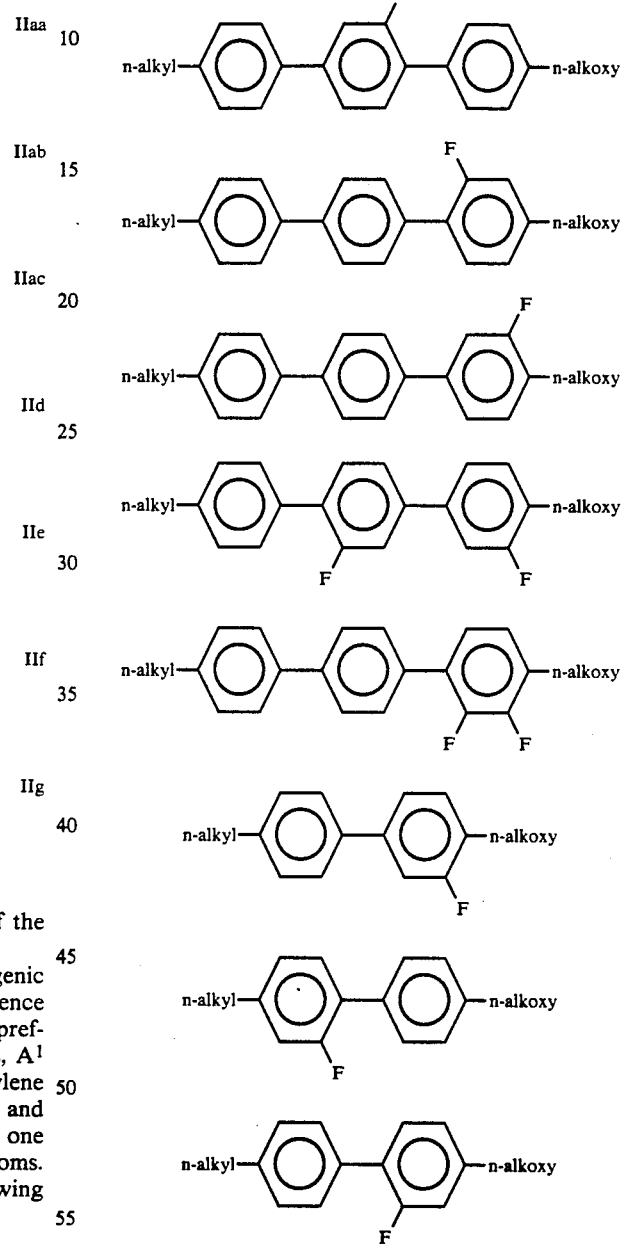

in which n-alkyl and n-alkoxy preferably each, independently of one another, have 1 to 7 carbon atoms.

Particularly preferred phases furthermore contain at least one component of the formula II and/or IV. $R^3$ is preferably straight-chain alkyl or alkoxy, each having 2 to 7 carbon atoms. $R^4$ and $R^5$ are each preferably straight-chain alkyl having 1 to 7 carbon atoms. $Q^1$ and $Q^2$ are preferably each, independently of one another, 1,4-phenylene or fluorine-substituted 1,4-phenylene. $A^1$, $A^2$ and $A^4$ are preferably each, independently of one another, trans-1,4-cyclohexylene or 1,4-phenylene. $Z^1$ and $Z^2$ are preferably each a single bond.

Preferred components of the formula III are those of the sub-formulae IIIa to IIIe,

 IIIa

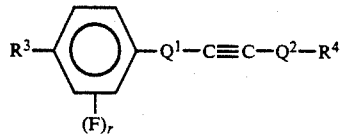 IIIb

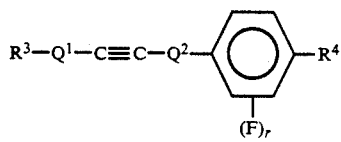 IIIc

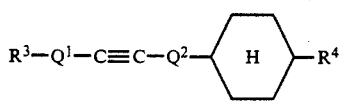 IIId

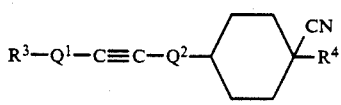 IIIe in which r is 0 or 1, and $R^3$, $R^4$, $Q^1$ and $Q^2$ have the preferred meanings given in the formula III.

Particular preference is given to components of the formulae IIIa and IIId. $R^3$ is preferably alkyl or alkoxy, particularly preferably n-alkoxy. $R^4$ is preferably straight-chain alkyl.

The liquid-crystal phases according to the invention preferably comprise 2 to 15, in particular 3 to 18, components. In addition to compounds of the formula I to IV, other constituents may also be present, for example in an amount of up to 45% of the total mixture, but preferably up to 34%, in particular up to 10%.

The phases according to the invention preferably simultaneously contain compounds of the formula III, in which (o+p) is zero or 1.

The other constituents are preferably selected from nematic or nematogenic substances, in particular known substances, from the classes comprising the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl or cyclohexylpyrimidines, phenyl- or cyclohexyldioxanes, optionally halogenated stilbenes, benzyl phenyl ethers, tolans, and substituted cinnamic acids.

The most important compounds which are suitable as constituents of liquid-crystal phases of this type may be characterised by the formula V

 V in which L and E are each a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is

| —CH—CH— | —N(O)=N— |
| —CH=CQ— | —CH=N(O)— |
| —C=C— | —CH$_2$—CH$_2$— |
| —CO—O— | —CH$_2$—O— |
| —CO—S | —CH$_2$—S— |
| —CH=N— | —COO—Phe—COO— | or a C—C single bond, Q is halogen, preferably chlorine, or —CN, and $R^6$ and $R^7$ are each alkyl, alkoxy, alkanoyloxy or alkoxycarbonyloxy having up to 18, preferably up to 8, carbon atoms, or one of these radicals is alternatively CN, NC, NO$_2$, CF$_3$, F, Cl or Br.

In most of these compounds, $R^6$ and $R^7$ are different from one another, one of these radicals usually being an alkyl or alkoxy group. However, other variants of the proposed substituents are also common. Many such substances or mixtures thereof are commercially available. All these substances can be prepared by methods which are known from the literature.

The examples below are intended to illustrate the invention without representing a limitation. Above and below, percentages are per cent by weight, all temperatures are given in degrees Celsius.

EXAMPLE 1

A liquid-crystalline medium comprising
20% of 2-(p-ethoxyphenyl)-5-propyl-1,3,4-thiadiazole,
20% of 2,3-difluoro-4-ethoxyphenyl trans-4-propylcyclohexanecarboxylate,
15% of 1-(trans-4-propylcyclohexyl)-2-(2,3-difluoro-4-ethoxybiphenyl-4'-yl)ethane,
15% of 2,3-difluoro-4-ethoxyphenyl trans-4-(trans-4-propylcyclohexyl)cyclohexylmethyl ether,
18% of trans-1-p-methoxyphenyl-4-propylcyclohexane,
3% of 4-(trans-4-propylcyclohexyl)-4'-methoxytolan,
3% of 4-(trans-4-propylcyclohexyl)-4'-ethoxytolan,
3% of 4-(trans-4-propylcyclohexyl)-4'-propoxytolan,
3% of 4,4'-bis(trans-4-propylcyclohexyl)-2-fluorobiphenyl
has a clear point of 92°, an S—N transition of <—20°, $\Delta\epsilon$ of —5.8 and $\Delta n$ of 0.147.

EXAMPLE 2

A liquid-crystalline medium comprising
8% of 2,3-difluoro-4-ethoxyphenyl trans-4-propylcyclohexanecarboxylate,
8% of 2,3-difluoro-4-ethoxyphenyl trans-4-butylcyclohexanecarboxylate,
8% of 2,3-difluoro-4-ethoxyphenyl trans-4-pentylcyclohexanecarboxylate,
8% of trans-1-p-methoxyphenyl-4-propylcyclohexane,
5% of trans-1-p-ethoxyphenyl-4-propylcyclohexane,
8% of trans-1-p-butoxyphenyl-4-propylcyclohexane,
5% of 4-methyl-4'-ethoxytolan,
4% of 4-ethyl-4'-methoxytolan,
6% of 2-(p-methoxyphenyl)-5-(trans-4-propylcyclohexyl)1,3,4-thiadiazole,
6% of 4-(trans-4-propylcyclohexyl)-4'-methoxytolan,
5% of 4-(trans-4-propylcyclohexyl)-4'-ethoxytolan,
7% of 4-(trans-4-propylcyclohexyl)-4'-propoxytolan and
2% of 4-(trans-4-pentylcyclohexyl)-4'-(trans-4-propylcyclohexyl)-2-fluorobiphenyl has a clear point of 81°, an S—N transition of < −40°, Δε of −2.0 and Δn of 0.152.

EXAMPLE 3

A liquid-crystalline medium comprising
8% of 2-(p-methoxyphenyl)-5-propyl-1,3,4-thiadiazole,
8% of 2-(p-methoxyphenyl)-5-butyl-1,3,4-thiadiazole,
8% of 2-(p-ethoxyphenyl)-5-propyl-1,3,4-thiadiazole,
17% of trans-1-p-methoxyphenyl-4-propylcyclohexane,
13% of trans-1-p-ethoxyphenyl-4-propylcyclohexane,
7% of trans-1-p-butoxyphenyl-4-propylcyclohexane,
5% of 4-methyl-4'-ethoxytolan,
4% of 4-ethyl-4'-methoxytolan,
8% of 2-(p-methoxyphenyl)-5-(trans-4-propylcyclohexyl)1,3,4-thiadiazole,
6% of 4-(trans-4-propylcyclohexyl)-4'-methoxytolan,
5% of 4-(trans-4-propylcyclohexyl)-4'-ethoxytolan,
7% of 4-(trans-4-propylcyclohexyl)-4'-propoxytolan and
4% of 4-(trans-4-pentcyclohexyl)-4'-(trans-4-propylcyclohexyl)-2-fluorobiphenyl
has a clear point of 80°, an S—N transition of < −40°, Δε of −2.1, Δn of 0.181, K$_3$/K$_1$ of 1.23 and a viscosity of 23 mPa.s at 20°.

EXAMPLE 4

A liquid-crystalline medium comprising
8% of 2-(p-methoxyphenyl)-5-propyl-1,3,4-thiadiazole,
8% of 2-(p-methoxyphenyl)-5-butyl-1,3,4-thiadiazole,
8% of 2-(p-ethoxyphenyl)-5-propyl-1,3,4-thiadiazole,
20% of trans-1-p-methoxyphenyl-4-propylcyclohexane,
14% of trans-1-p-ethoxyphenyl-4-propylcyclohexane,
5% of 4-methyl-4'-ethoxytolan,
4% of 4-ethyl-4'-methoxytolan,
8% of 2-(p-methoxyphenyl)-5-(trans-4-propylcyclohexyl)-1,3,4-thiadiazole,
6% of 4-(trans-4-propylcyclohexyl)-4'-methoxytolan,
5% of 4-(trans-4-propylcyclohexyl)-4'-ethoxytolan,
7% of 4-(trans-4-propylcyclohexyl)-4'-propoxytolan and
7% of 1-(4'-pentylbiphenyl-4-yl)-2-(p-ethoxyphenyl)-ethane
has a clear point of 78°, an S—N transition of < −30°, Δε of −2.0, Δn of 0.188, K$_3$/K$_1$ of 1.31 and a viscosity of 22 mPa.s at 20°.

EXAMPLE 5

0.25 mol of anisohydrazide is dissolved in 300 ml of pyridine. At room temperature, 0.25 mol of butyryl chloride is added dropwise, and the mixture is stirred for a further 1½ hours. The mixture is subsequently poured into 1.5 l of ice/water, and the crystals are filtered off with suction and washed with water. The N-(4-methoxybenzoyl)-N'-butyrylhydrazine obtained is recrystallized from toluene. 0.1 mol of this compound and 0.1 mol of Lawesson's reagent are refluxed for 10 hours in 200 ml of THF. ⅔ of the solvent are removed by distillation, the residue is poured into 500 ml of water and 50 ml of 32% sodium hydroxide solution, and the precipitate is filtered off with suction and recrystallized from ethanol/activated charcoal, to give 2-(p-methoxyphenyl)-5-propyl-1,3,4-thiadiazole, m.p. 54°, C 0°.

The following are prepared analogously:
2-(p-ethoxyphenyl)-5-propyl-1,3,4-thiadiazole, m.p. 75°, C 30°
2-(p-ethoxyphenyl)-5-butyl-1,3,4-thiadiazole, m.p. 69°, C 10°
2-(p-ethylphenyl)-5-butyl-1,3,4-thiadiazole, m.p. 13°, C −60°
2-(p-ethylphenyl)-5-propyl-1,3,4-thiadiazole, m.p. 20°, C −50°
2-(p-methoxyphenyl)-5-butyl-1,3,4-thiadiazole, m.p. 55°, C 0°
2-(p-methoxyphenyl)-5-(trans-4-n-propylcyclohexyl)-1,3,4-thiadiazole, m.p. 91°, b.p. 187° (pure nematic)

EXAMPLE 6

0.25 mol of p-(p-n-propylphenyl)phenylpropionohydrazide is dissolved in 300 ml of pyridine. At room temperature, 0.25 mol of butyryl chloride is added dropwise, and the mixture is stirred for a further 1½ hours. The mixture is then poured into 1.5 l of ice/water, and the crystals are filtered off with suction and washed with water. The product obtained is recrystallized from toluene. 0.1 mol of this compound and 0.1 mol of Lawesson's reagent are refluxed for 10 hours in 200 ml of THF. ⅔ of the solvent are removed by distillation, the residue is poured into 500 ml of water and 50 ml of 32% sodium hydroxide solution, and the precipitate is filtered off with suction and recrystallized from ethanol/activated charcoal to give 2-[2-(4-n-propylbiphenyl-4'-yl)ethyl]-5-propyl-1,3,4-thiadiazole.

The following are prepared analogously:
2-[2-(4-n-propylbiphenyl-4'-yl)ethyl]-5-ethyl-1,3,4-thiadiazole
2-[2-(4-n-propylbiphenyl-4'-yl)ethyl]-5-butyl-1,3,4-thiadiazole
2-[2-(4-n-propylbiphenyl-4'-yl)ethyl]-5-pentyl-1,3,4-thiadiazole
2-[2-(4-n-propylbiphenyl-4'-yl)ethyl]-5-heptyl-1,3,4-thiadiazole
2-[2-(4-n-pentylbiphenyl-4'-yl)ethyl]-5-ethyl-1,3,4-thiadiazole
2-[2-(4-n-pentylbiphenyl-4'-yl)ethyl]-5-propyl-1,3,4-thiadiazole
2-[2-(4-n-pentylbiphenyl-4'-yl)ethyl]-5-butyl-1,3,4-thiadiazole
2-[2-(4-n-pentylbiphenyl-4'-yl)ethyl]-5-pentyl-1,3,4-thiadiazole
2-[2-(4-n-pentylbiphenyl-4'-yl)ethyl]-5-heptyl-1,3,4-thiadiazole
2-[2-(p-trans-4-n-propylcyclohexylphenyl)ethyl]-5-ethyl-1,3,4-thiadiazole
2-[2-(p-trans-4-n-propylcyclohexylphenyl)ethyl]-5-propyl-1,3,4-thiadiazole
2-[2-(p-trans-4-n-propylcyclohexylphenyl)ethyl]-5-butyl-1,3,4-thiadiazole
2-[2-(p-trans-4-n-propylcyclohexylphenyl)ethyl]-5-pentyl-1,3,4-thiadiazole
2-[2-(p-trans-4-n-propylcyclohexylphenyl)ethyl]-5-heptyl-1,3,4-thiadiazole
2-[2-(p-trans-4-n-ethylcyclohexylphenyl)ethyl]-5-ethyl-1,3,4-thiadiazole
2-[2-(p-trans-4-n-ethylcyclohexylphenyl)ethyl]-5-propyl-1,3,4-thiadiazole
2-[2-(p-trans-4-n-ethylcyclohexylphenyl)ethyl]-5-butyl-1,3,4-thiadiazole
2-[2-(p-trans-4-n-ethylcyclohexylphenyl)ethyl]-5-pentyl-1,3,4-thiadiazole
2-[2-(p-trans-4-n-ethylcyclohexylphenyl)ethyl]-5-heptyl-1,3,4-thiadiazole
2-[2-(p-trans-4-n-pentylcyclohexylphenyl)ethyl]-5-ethyl-1,3,4-thiadiazole
2-[2-(p-trans-4-n-pentylcyclohexylphenyl)ethyl]-5-propyl-1,3,4-thiadiazole 2-[2-(p-trans-4-n-pentylcyclohexylphenyl)ethyl]-5-butyl-1,3,4-thiadiazole
2-[2-(p-trans-4-n-pentylcyclohexylphenyl)ethyl]-5-pentyl-1,3,4-thiadiazole
2-[2-(p-trans-4-n-pentylcyclohexylphenyl)ethyl]-5-heptyl-1,3,4-thiadiazole

EXAMPLE 7

0.25 mol of trans-4-(trans-4-n-propylcyclohexyl)cyclohexanecarbohydrazide is dissolved in 300 ml of pyridine. At room temperature, 0.25 mol of butyryl chloride is added dropwise, and the mixture is stirred for a further 1½ hours. The mixture is then poured into 1.5 l of ice/water, and the crystals are filtered off with suction and washed with water. The product obtained is recrystallized from toluene. 0.1 mol of this compound and 0.1 mol of Lawesson's reagent are refluxed for 10 hours in 200 ml of THF. ⅔ of the solvent are removed by distillation, the residue is poured into 500 ml of water and 50 ml of 32% sodium hydroxide solution, and the precipitate is filtered off with suction and recrystallized from ethanol/activated charcoal to give 2-[trans-4-(trans-4-n-propylcyclohexyl)cyclohexyl]-5-propyl-1,3,4-thiadiazole.

EXAMPLE 8

0.25 mol of p-(trans-4-n-propylcyclohexyl)benzohydrazide is dissolved in 300 ml of pyridine. At room temperature, 0.25 mol of butyryl chloride is added dropwise, and the mixture is stirred for a further 1½ hours. The mixture is then poured into 1.5 l of ice/water, and the crystals are filtered off with suction and washed with water. The product obtained is recrystallized from toluene. 0.1 mol of this compound and 0.1 mol of Lawesson's reagent are refluxed for 10 hours in 200 ml of THF. ⅔ of the solvent are removed by distillation, the residue is poured into 500 ml of water and 50 ml of 32% sodium hydroxide solution, and the precipitate is filtered off with suction and recrystallized from ethanol/activated charcoal to give 2-[p-(trans-4-n-propylcyclohexyl)phenyl]-5-propyl-1,3,4-thiadiazole.

The following are prepared analogously:
2-[p-(trans-4-n-propylcyclohexyl)phenyl]-5-methyl-1,3,4-thiadiazole
2-[p-(trans-4-n-propylcyclohexyl)phenyl]-5-ethyl-1,3,4-thiadiazole
2-[p-(trans-4-n-propylcyclohexyl)phenyl]-5-pentyl-1,3,4-thiadiazole
2-[p-(2-(trans-4-pentylcyclohexyl)phenyl]-5-methyl-1,3,4-thiadiazole
2-[p-(2-(trans-4-pentylcyclohexyl)phenyl]-5-ethyl-1,3,4-thiadiazole
2-[p-(2-(trans-4-pentylcyclohexyl)phenyl]-5-propyl-1,3,4-thiadiazole
2-[p-(2-(trans-4-pentylcyclohexyl)phenyl]-5-pentyl-1,3,4-thiadiazole
2-[p-(2-(trans-4-pentylcyclohexyl)phenyl]-5-heptyl-1,3,4-thiadiazole
2-[p-(2-(trans-4-ethylcyclohexylethyl)phenyl]-5-methyl-1,3,4-thiadiazole
2-[p-(2-(trans-4-ethylcyclohexylethyl)phenyl]-5-ethyl-1,3,4-thiadiazole
2-[p-(trans-4-ethylcyclohexylethyl)phenyl]-5-propyl-1,3,4-thiadiazole
2-[p-(2-(trans-4-ethylcyclohexylethyl)phenyl]-5-pentyl-1,3,4-thiadiazole
2-[p-(2-(trans-4-ethylcyclohexylethyl)phenyl]-5-heptyl-1,3,4-thiadiazole
2-[p-(2-(trans-4-propylcyclohexylethyl)phenyl]-5-methyl-1,3,4-thiadiazole
2-[p-(2-(trans-4-propylcyclohexylethyl)phenyl]-5-ethyl-1,3,4-thiadiazole
2-[p-(2-(trans-4-propylcyclohexylethyl)phenyl]-5-propyl-1,3,4-thiadiazole
2-[p-(2-(trans-4-propylcyclohexylethyl)phenyl]-5-pentyl-1,3,4-thiadiazole
2-[p-(2-(trans-4-propylcyclohexylethyl)phenyl]-5-heptyl-1,3,4-thiadiazole
2-[p-(2-(trans-4-pentylcyclohexylethyl)phenyl]-5-methyl-1,3,4-thiadiazole
2-[p-(2-(trans-4-pentylcyclohexylethyl)phenyl]-5-ethyl-1,3,4-thiadiazole
2-[p-(2-(trans-4-pentylcyclohexylethyl)phenyl]-5-propyl-1,3,4-thiadiazole
2-[p-(2-(trans-4-pentylcyclohexylethyl)phenyl]-5-pentyl-1,3,4-thiadiazole
2-[p-(2-(trans-4-pentylcyclohexylethyl)phenyl]-5-heptyl-1,3,4-thiadiazole
2-[p-(2-p-ethylphenylethyl)phenyl]-5-methyl-1,3,4-thiadiazole
2-[p-(2-p-ethylphenylethyl)phenyl]-5-ethyl-1,3,4-thiadiazole
2-[p-(2-p-ethylphenylethyl)phenyl]-5-propyl-1,3,4-thiadiazole
2-[p-(2-p-ethylphenylethyl)phenyl]-5-pentyl-1,3,4-thiadiazole
2-[p-(2-p-ethylphenylethyl)phenyl]-5-heptyl-1,3,4-thiadiazole
2-[p-(2-p-ethoxyphenylethyl)phenyl]-5-methyl-1,3,4-thiadiazole
2-[p-(2-p-ethoxyphenylethyl)phenyl]-5-ethyl-1,3,4-thiadiazole
2-[p-(2-p-ethoxyphenylethyl)phenyl]-5-propyl-1,3,4-thiadiazole
2-[p-(2-p-ethoxyphenylethyl)phenyl]-5-pentyl-1,3,4-thiadiazole
2-[p-(2-p-ethoxyphenylethyl)phenyl]-5-heptyl-1,3,4-thiadiazole
2-[p-(2-p-propylphenylethyl)phenyl]-5-methyl-1,3,4-thiadiazole
2-[p-(2-p-propylphenylethyl)phenyl]-5-ethyl-1,3,4-thiadiazole
2-[p-(2-p-propylphenylethyl)phenyl]-5-propyl-1,3,4-thiadiazole
2-[p-(2-p-propylphenylethyl)phenyl]-5-pentyl-1,3,4-thiadiazole
2-[p-(2-p-propylphenylethyl)phenyl]-5-heptyl-1,3,4-thiadiazole
2-[p-(2-p-pentylphenylethyl)phenyl]-5-methyl-1,3,4-thiadiazole
2-[p-(2-p-pentylphenylethyl)phenyl]-5-ethyl-1,3,4-thiadiazole
2-[p-(2-p-pentylphenylethyl)phenyl]-5-propyl-1,3,4-thiadiazole
2-[p-(2-p-pentylphenylethyl)phenyl]-5-pentyl-1,3,4-thiadiazole
2-[p-(2-p-pentylphenylethyl)phenyl]-5-heptyl-1,3,4-thiadiazole

We claim:

1. A nematic liquid crystal medium which comprises a thiadiazole derivative of Formula I

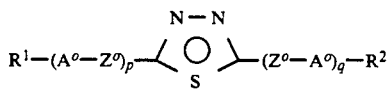
wherein p+q is 2, A° is 1,4-phenylene, one Z° group is —CH₂CH₂—, the other remaining Z° groups are single bons, and R¹ and R² are each, independently of one another, an alkyl group of up to 5 carbon atoms in which one —CH₂— group may be replaced by —O—.
2. A nematic liquid crystal medium as in claim 1, wherein the sum of the carbon atoms for R¹ +R² is from 2 to 8 carbon atoms.
* * * * *